United States Patent
Laur et al.

(10) Patent No.: US 8,299,764 B2
(45) Date of Patent: Oct. 30, 2012

(54) SYSTEM AND METHOD FOR DETERMINING OUTPUT VOLTAGE LEVEL INFORMATION FROM PHASE VOLTAGE FOR SWITCHED MODE REGULATOR CONTROLLERS

(75) Inventors: Steven P. Laur, Raleigh, NC (US); Rhys S. A. Philbrick, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 357 days.

(21) Appl. No.: 12/700,103

(22) Filed: Feb. 4, 2010

(65) Prior Publication Data
US 2010/0270995 A1 Oct. 28, 2010

Related U.S. Application Data

(60) Provisional application No. 61/172,373, filed on Apr. 24, 2009.

(51) Int. Cl.
*G05F 1/613* (2006.01)
(52) U.S. Cl. .......................... 323/224; 323/284
(58) Field of Classification Search ............... 323/224, 323/284, 282, 283
See application file for complete search history.

(56) References Cited

U.S. PATENT DOCUMENTS

| | | | |
|---|---|---|---|
| 6,879,137 B2* | 4/2005 | Sase et al. | 323/282 |
| 7,791,324 B2* | 9/2010 | Mehas et al. | 323/283 |
| 8,085,022 B2* | 12/2011 | Chen et al. | 323/282 |
| 2010/0026256 A1* | 2/2010 | Liu et al. | 323/282 |

* cited by examiner

*Primary Examiner* — Shawn Riley
(74) *Attorney, Agent, or Firm* — Gary Stanford

(57) ABSTRACT

A controller integrated circuit for a switched mode regulator which converts an input voltage to an output voltage. The controller includes a phase pin, a modulation circuit and a filter. The modulation circuit is configured to regulate the output voltage using the input voltage and output voltage level information. The filter has an input coupled to the phase pin and an output providing the output voltage level information which approximates the output voltage based on phase pin voltage. Various filters are contemplated, including passive and active low pass filters and the like. A regulator using such a controller is disclosed. A method of determining a voltage level of an output voltage includes receiving a phase voltage from a phase pin coupled to the phase node, and filtering the phase voltage to provide an output sense voltage having a voltage level approximating the voltage level of the output voltage.

17 Claims, 3 Drawing Sheets

SYSTEM AND METHOD FOR DETERMINING OUTPUT VOLTAGE LEVEL INFORMATION FROM PHASE VOLTAGE FOR SWITCHED MODE REGULATOR CONTROLLERS

CROSS-REFERENCE TO RELATED APPLICATIONS

This application claims the benefit of U.S. Provisional Application Ser. No. 61/172,373, filed on Apr. 24, 2009, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

Figure 1:
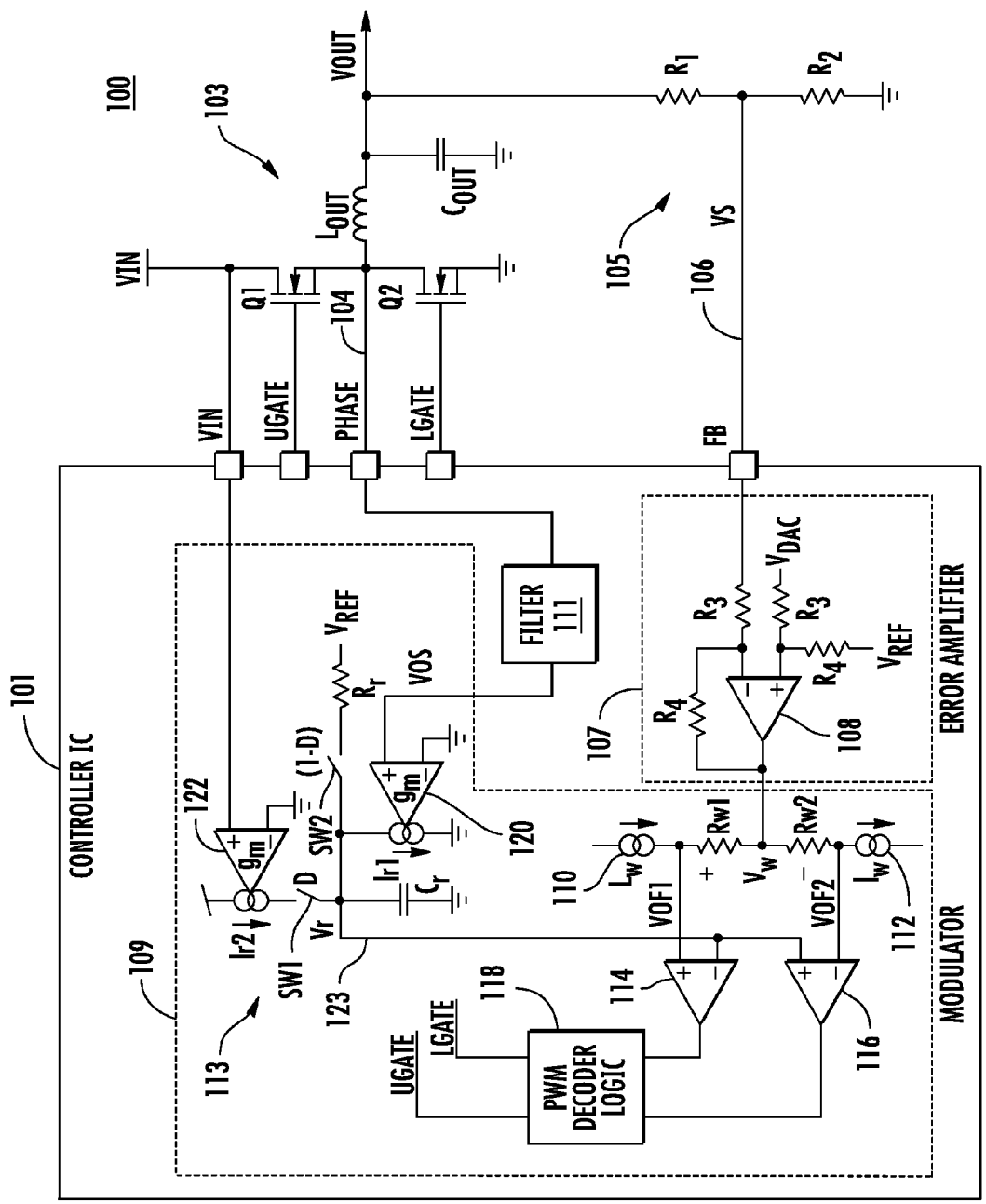
FIG. 1 is a schematic and block diagram of a synthetic ripple regulator including a controller modulator IC implemented according to one embodiment.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Many conventional switched mode regulator controller integrated circuits (IC) or chips require output voltage level information for regulation and frequency control. For example, regulator chips employing constant on-time modulation techniques typically need regulator output voltage level information. The output voltage level information was conventionally provided via a dedicated output voltage sense pin, labeled VOUT or VO or the like. The use of a pin dedicated to sensing the regulator output voltage level precluded using the pin for other functions. The cost of this pin can mean the loss or gain of a crucial feature, or the exclusion of a desired package type. It can even determine whether a part is viable for the market place, such as determining whether or not a business case can be made.

A system and method for determining output voltage information from phase voltage for switched mode regulator controllers as described herein allows for output voltage information to be determined from the phase voltage rather than directly from the output voltage node. In this manner, a controller chip does not need an additional input pin for sensing output voltage, thereby allowing package pin reduction or otherwise freeing an additional pin with which to provide additional functionality in the same package.

A system and method for determining output voltage information from phase voltage for switched mode regulator controllers as described herein for a controller chip configuration uses the phase voltage sense pin to extract output voltage information for the modulator. A phase sense pin is already used for other various switch sensing functions, so it may be used to sense the output voltage level rather than a dedicated output voltage sense pin. For example, the phase pin may be used to create a drive signal for the high side electronic switch. When the high side switch is implemented as a field-effect transistor (FET) and is turned off, its gate should be shorted to its source (which is typically coupled to the phase node). The phase node may also be used by the controller IC to sense current through either of the electronic switches, which information may be used for protection or for inductor current zero crossing detection. In one embodiment, the average phase voltage is nearly equivalent to the regulated output voltage. If the phase voltage is filtered, even moderately, the filtered phase information may be used to generate on-chip output voltage information. Thus, the output voltage sense pin may be eliminated or the pin may be used for another function.

FIG. 1 is a schematic and block diagram of a synthetic ripple regulator 100 including a controller modulator IC 101 implemented according to one embodiment. The regulator 100 includes a controller modulator IC 101, an output switching circuit 103, and a feedback circuit 105. The controller modulator IC 101 incorporates an error amplifier circuit 107, a modulator 109, and a filter 111. The output switching circuit 103 includes a pair of electronic switches Q1 and Q2, an output inductor $L_{OUT}$, and an output capacitor $C_{OUT}$, and converts an input voltage VIN to a regulated output voltage VOUT. The electronic switches Q1 and Q2 have current paths coupled in series between VIN and ground (GND) and may be implemented as FETs or metal-oxide semiconductor (MOSFETs) or the like as understood by those skilled in the art. As shown, the electronic switches are implemented as N-channel MOSFETs, in which the drain of Q1 is coupled to VIN, the source of Q1 is coupled to the drain of Q2, and the source of Q2 is coupled to GND. A phase node 104 coupling the source of Q1 to the drain of Q2 is further coupled to one end of the output inductor $L_{OUT}$. The other end of $L_{OUT}$ is coupled to $C_{OUT}$ at an output node which develops VOUT. The phase node 104 is provided to a PHASE pin of the controller modulator IC 101. The output voltage VOUT is provided to the feedback circuit 105, which develops a feedback signal provided to a feedback pin FB of the controller modulator IC 101. As shown, the feedback circuit includes resistors $R_1$ and $R_2$ coupled in series between VOUT and GND forming a voltage divider having an intermediate node 106 coupled to the FB pin of 101.

The node 106 develops an output sense voltage VS which is used by the controller modulator IC 101 to regulate the voltage level of VOUT. It is noted, however, that the user chooses the nominal or target voltage level of VOUT by the relative resistance values of the resistors $R_1$ and $R_2$ so that the sense voltage VS may not be used alone to provide the actual voltage level of VOUT. Thus, the sense voltage VS does not provide output voltage level information but instead is used to indicate relative error of the output voltage.

The FB pin is coupled to the error amplifier circuit 107 within the controller modulator IC 101. As shown, the FB pin is coupled to one end of first $R_3$ resistor, having its other end coupled to the inverting input of an error amplifier 108 and to one end of a first $R_4$ resistor. The other end of the first $R_4$ resistor is coupled to the output of the error amplifier 108. A second $R_3$ resistor has one end coupled to a voltage $V_{DAC}$ and its other end coupled to the non-inverting input of the error amplifier 108 and to one end of a second $R_4$ resistor. The other end of the second $R_4$ resistor is coupled to a reference voltage $V_{REF}$. The error amplifier circuit 107 develops a compensation window voltage $V_W$ at the output of the error amplifier 108, in which $V_W$ is provided to the modulator 109 within the controller modulator IC 101. In one embodiment, the first and second $R_3$ resistors have about the same resistance with each other, and the first and second $R_4$ resistors have about the same resistance with each other, although the resistance of the $R_3$ resistors is not necessarily the same as the resistance of $R_4$ resistors.

The modulator 109 includes a window circuit developing first and second offset voltages VOF1 and VOF2 relative to the window voltage $V_W$. As shown, a current source 110 sources a current $I_W$ into a first end of a first window resistor $R_{W1}$, having its second end coupled to the output of the error amplifier 108 and to a first end of a second window resistor $R_{W2}$. A current sink 112 sinks the current $I_W$ from the second end of the resistor $R_{W2}$. The first end of $R_{W1}$ develops the first offset voltage VOF1, which is provided to the non-inverting input of a first comparator 114. The second end of $R_{W2}$ develops the second offset voltage VOF2, which is provided to the inverting input of a second comparator 116. The inverting input of comparator 114 and the non-inverting input of the comparator 116 both receive a ripple voltage Vr. The pair of comparators 114 and 116 collectively implement a hysteretic function forming an offset voltage above $V_W$ for triggering the comparator 114 and forming another offset voltage below $V_W$ for triggering the comparator 116, both relative to the ripple voltage Vr. The outputs of the comparators 114 and 116 are provided to corresponding inputs of pulse width modulation (PWM) decoder logic 118, having a first output providing a gate control signal UGATE and a second output providing a gate control signal LGATE. The UGATE signal is provided to a UGATE pin which is coupled to the gate of Q1, and the LGATE signal is provided to an LGATE pin which is coupled to the gate of Q2. Q1 is turned on while Q2 is off to provide current to the output node developing VOUT and Q2 is turned on while Q1 is off to pull current from the output node. In this manner, the modulator 109 develops the gate control signals UGATE and LGATE to control the electronic switches Q1 and Q2, respectively, to regulate the output voltage VOUT.

In the illustrated embodiment, the modulator 109 includes a transconductance circuit 113 including transconductance amplifiers 120 and 122, single-pole, single-throw (SPST) switches SW1 and SW2, a ripple resistor Rr and a ripple capacitor Cr. An output voltage sense voltage VOS is provided to the non-inverting input of transconductance amplifier 120, having its inverting input coupled to ground and its output developing a first ripple current Ir1. The output of the transconductance amplifier 120 is coupled between a ripple node 123 and ground. The ripple node 123 develops the ripple voltage Vr. The input voltage VIN is provided to the VIN pin of controller modulator IC 101, which is further provided to the non-inverting input of the transconductance amplifier 122, having its inverting input coupled to ground. The output of the transconductance amplifier 122 develops a second ripple current Ir2 and is coupled between a source voltage and one end of a switch SW1. The other end of the switch SW1 is coupled to ripple node 123. The ripple capacitor Cr is coupled between ripple node 123 and ground. A second switch SW2 is coupled between ripple node 123 and one end of the ripple resistor Rr, having its other end receiving the reference voltage VREF. The transconductance amplifiers 120 and 122 each convert an input voltage to an output current according to transconductance "$g_m$" operation. In one embodiment, the gain of the transconductance amplifiers 120 and 122 is about the same, although the transconductance gain may also be different.

In operation of the transconductance circuit 113, the transconductance amplifier 120 develops the first ripple current Ir1 proportional to VOS and the transconductance amplifier 120 develops the second ripple current Ir2 proportional to VIN. The switches SW1 and SW2 are controlled by the duty cycle D of the PWM signal controlling switching of Q1 and Q2. The switch SW1 is controlled by D such that it is turned on and off with Q1. The switch SW2 is controlled by D−1, or the remainder of the duty cycle, so that it is turned on and off with Q2. Switch SW2 is opened while SW1 is closed and vice-versa. When switch SW1 is closed, SW2 is open and the current Ir2, which is proportional to VIN, charges the ripple capacitor Cr so that the ripple voltage Vr increases. Since the output of the transconductance amplifier 120 is coupled to the ripple node 123, the charging current is Ir2−Ir1. It is noted that since VIN is greater than VOUT in the illustrated embodiment or a buck-type converter, so that Ir2>Ir2 so that the voltage Vr increases while SW1 is closed. Then SW1 is opened and SW2 is closed for the remainder of the cycle so that In discharges the ripple capacitor Cr. Also, while SW2 is closed, the reference voltage VREF is coupled to the ripple node Vr via the ripple resistor Rr. The ripple resistor Rr provides compensation or otherwise modifies frequency response by discharging the ripple capacitor Cr at the appropriate rate to prevent charge build-up. Also, in certain embodiments, the DC voltage on the capacitor Cr may go too high and/or too low, so that it is biased to the reference voltage VREF via the relatively large resistor Rr. Suitable voltage levels other than VREF may be used based on the particular implementation.

When SW1 is open and SW2 is closed, the ripple voltage Vr ramps or otherwise decreases until it falls below the offset voltage VOF2 as detected by the comparator 116. The comparator 116 switches its output as detected by the PWM decoder logic 118, which then turns Q1 on to initiate the next power cycle. SW1 is closed and SW2 is opened so that the ripple voltage Vr ramps up or otherwise increases during the power cycle. When Vr rises above the offset voltage VOF1 as detected by the comparator 114, the comparator 114 switches its output as detected by the PWM decoder logic 118, which then turns Q1 off to terminate the current power cycle. Operation repeats in this manner for synthetic ripple regulation.

Conventional modulator chips include an output sense pin which is coupled directly to VOUT for providing or otherwise developing the output voltage information provided to the transconductance circuit within the modulator. The controller modulator IC 101, however, does not use an output voltage sense input pin. Instead, the PHASE input pin is further coupled within the controller modulator IC 101 to an input of an internal filter circuit 111, which has an output providing the VOS signal. The VOS signal has a voltage level which approximates the level of VOUT. It is noted that although a synthetic ripple regulator is shown and described herein, it is understood that a system and method for determining output voltage information from phase voltage for switched mode regulator controllers as described herein may be applied to any regulator or modulator receiving output voltage information for performing modulation among other functions. Thus, the filter 111 coupled to the PHASE input may be used for other modulators in which the output voltage is sensed.

The accuracy of the output voltage information is not a critical parameter of the modulator. It can contain some AC (ripple) information and small DC errors and still maintain overall regulation and transient response. Inherently, the phase node 104 waveform contains VOUT information aside from some non-idealities. The voltage of the phase node 104 is averaged by the output inductor-capacitor filter to produce the DC value at the output. The following equation (1) expresses the ideal phase to voltage relationship:

$$AVG(V_{PHASE}) = \frac{1}{T_s}\int_0^{T_s} V_{PHASE} \cdot dt = D \cdot VIN = VOUT \quad (1)$$

where D is the duty cycle as defined by (VOUT/VIN) and $T_S$ is the switching period. In reality, the average value of PHASE is slightly higher than that of VOUT due to losses in board copper and inductor DCR. In addition, unless a very large low-pass filter is used on PHASE (not practical in silicon), there is ripple on the averaged PHASE voltage. Neither of these factors produce any significant error in regulation or reduction in transient response.

Figure 2:
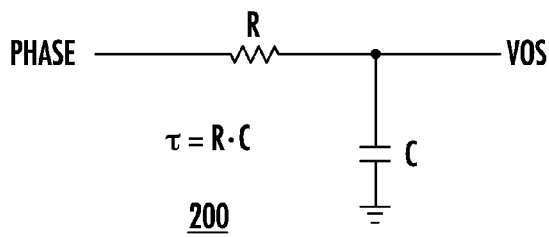
FIGS. 2-4 are schematic diagrams of passive low-pass filters which may each be used as the filter of FIG. 1.

The implementation of the filter 111 can take one of many different forms. FIG. 2 is a schematic diagram of a passive low-pass filter 200 which may be used as the filter 111 of FIG. 1. The filter 200 is implemented as a simple first order Butterworth resistor-capacitor (R-C) filter which is easy to implement in silicon and provides the desired output voltage information. The filter 200 has a time constant $\tau = R \cdot C$ and a break frequency $F_B = 1/(2\pi R \cdot C)$. Various filter configurations may be used as the filter 111 as indicated by the following lists, which are not exhaustive but provide example configurations. Filter types include Butterworth, Chebyshev, Bessel, Sallen-Key, etc. Some specific filter implementations include first order series R-C low-pass filters, first order series L-R low-pass filters (in which "L" denotes inductance), first order active low-pass filters (e.g., using an active device such as an operational amplifier, such as, for example, an integrator configuration using an inverting operational amplifier or the like), second order series L-C low-pass filters, etc.

Figure 3:
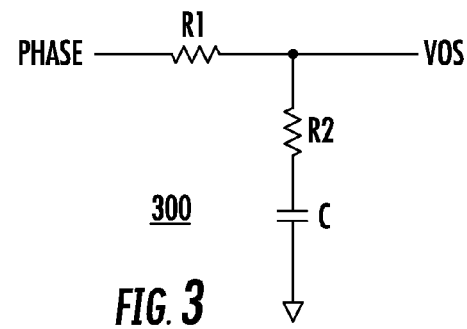

FIG. 3 is a schematic diagram of another passive low-pass filter 300 which may be used as the filter of 111 of FIG. 1. The filter 300 is similar to the filter 200, including a first resistor R1 and a capacitor C coupled in similar fashion, and further including a second resistor R2 coupled between VOS and the capacitor C. Operation is similar.

Figure 4:
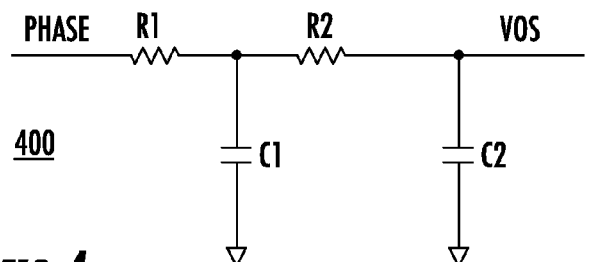

FIG. 4 is a schematic diagram of another passive low-pass filter 400 which may be used as the filter of 111 of FIG. 1. The filter 400 is slightly more complicated including first and second resistors R1 and R2 coupled in series between PHASE and VOS, a first capacitor C1 coupled between the junction between R1 and R2 and ground, and a second capacitor C2 coupled between VOS and ground.

Figure 5:
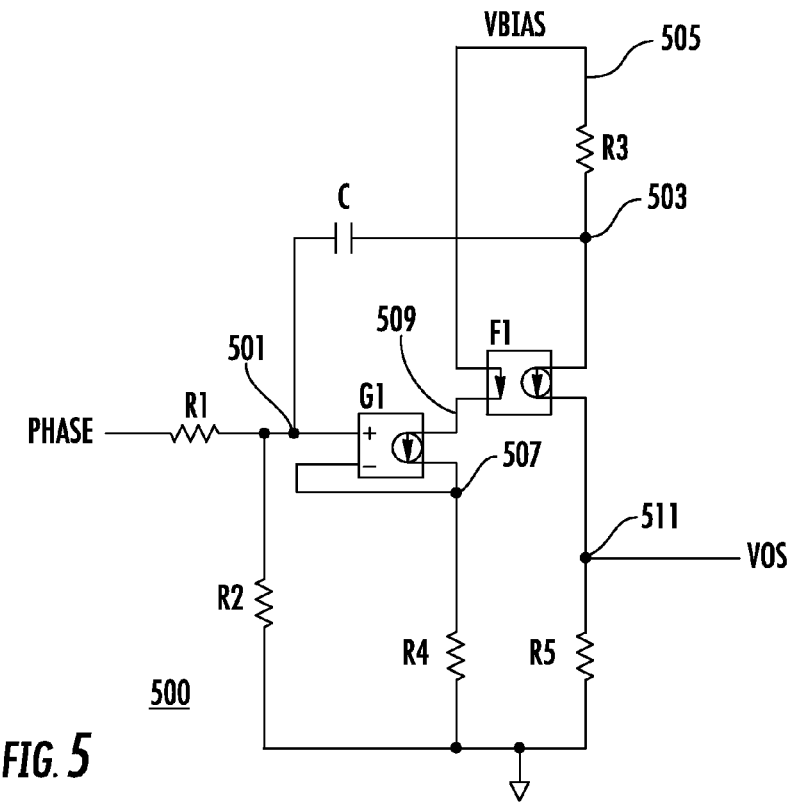
FIG. 5 is a schematic diagram of an active low pass filter which may be used as the filter of FIG. 1.

FIG. 5 is a schematic diagram of an active low pass filter 500 which may be used as the filter of 111 of FIG. 1. In this case, a resistor R1 is coupled between PHASE and a node 501 and a filter capacitor C is coupled between node 501 and another node 503. A resistor R2 is coupled between node 501 and ground. A node 505 develops a DC bias voltage VBIAS, and a resistor R3 is coupled between nodes 503 and 505. A transconductance amplifier G1 has its non-inverting input node coupled to node 501, its inverting input node coupled to a node 507, and its current output terminals coupled between a nodes 509 and 507. A current mirror F1 has its input current terminals coupled between nodes 505 and 509 and its output current terminals coupled between node 503 and an output node 511 developing the VOS voltage. A resistor R4 is coupled between node 507 and ground and a resistor R5 is coupled between node 511 and ground.

Figure 6:
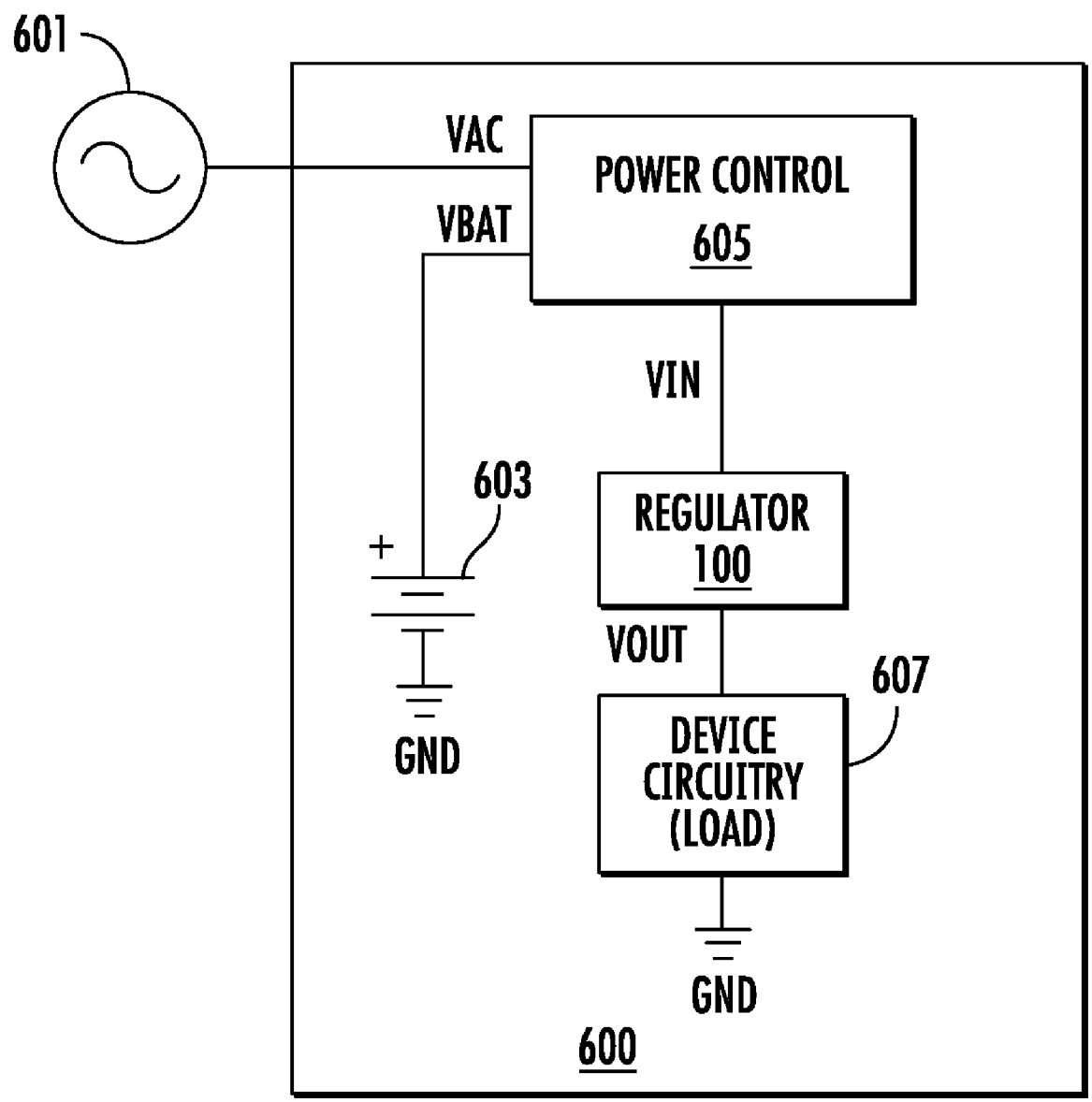
FIG. 6 is a simplified block diagram of an electronic device including the regulator of FIG. 1.

FIG. 6 is a simplified block diagram of an electronic device 600 including the regulator 100. Again, the regulator 100 is exemplary only and any other type of switched mode regulator is contemplating which uses a controller incorporating a filter receiving phase information and providing output voltage level information. The electronic device 600 receives source voltage from an alternating current (AC) source 601 and/or a battery 603. The AC source 601 provides an AC voltage VAC and the battery 603 provides a battery voltage VBAT to respective inputs of a power control circuit 605, having an output providing the input voltage VIN to the regulator 100. The battery 603 may or may not be included and if included, may or may not be a rechargeable battery. The output of the regulator 100 provides the output voltage VOUT to load circuitry 607, which generally represents or otherwise includes the circuitry of the electronic device 600. The electronic device 600 represents any type of electronic device in which it is desired to convert a first DC voltage to a second regulated DC voltage. Non-limiting examples of electronic devices may include any type of general or specific purpose residential, commercial, military or medical electronic devices, any type of computing type devices (e.g., notebooks, desktops, laptops, tablet computers, computer pads, etc.), any type of portable, mobile or hand-held electronic type devices (e.g., personal digital assistants, mobile or cellular phones, personal media devices, mobile internet devices, etc.).

A controller integrated circuit for a switched mode regulator which converts an input voltage to an output voltage according to one embodiment includes a phase pin, a modulation circuit and a filter. The modulation circuit is configured to regulate the output voltage using the input voltage and output voltage level information. The filter has an input coupled to the phase pin and an output providing the output voltage level information which approximates the output voltage based on voltage of the phase pin. Various filters are contemplated, such as a low pass filter, a resistor-capacitor filter, a first order Butterworth filter, an active low pass filter, etc.

An electronic device according to one embodiment includes a switching circuit, a feedback circuit, and a controller chip. The switching circuit converts an input voltage to an output voltage via a phase node. The feedback circuit receives the output voltage and provides a feedback voltage. The controller chip includes a phase pin, a feedback pin, a modulation circuit, and a filter. The phase pin is coupled to the phase node and the feedback pin receives the feedback voltage. The modulation circuit is configured to regulate the output voltage based on the input voltage, the feedback voltage and output voltage level information. The filter has an input coupled to the phase pin and an output providing the output voltage level information which approximates the output voltage based on voltage of said phase pin. Various filters are contemplated, such as a low pass filter, a resistor-capacitor filter, a first order Butterworth filter, an active low pass filter, etc. The switching circuit, feedback circuit and controller chip may collectively form a regulator for providing the output voltage to load circuitry of the electronic device.

A method of determining a voltage level of an output voltage by a controller chip for a switched mode regulator which operates to convert an input voltage to an output voltage via a phase node includes receiving, by the controller chip, a phase voltage from a phase pin coupled to the phase node, and filtering, by the controller chip, the phase voltage to provide an output sense voltage having a voltage level approximating the voltage level of the output voltage.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A controller integrated circuit for a switched mode regulator which converts an input voltage to an output voltage, comprising:
   a phase pin;
   a feedback pin;
   a modulation circuit which is configured to regulate the output voltage using the input voltage and output voltage level information, comprising:
      an error amplifier circuit coupled to said feedback pin providing an output voltage error indication; and
      a modulator receiving said output voltage error indication and providing at least one switch control signal for controlling an external switch circuit, comprising:
         a window circuit which develops first and second offset voltages based on said output voltage error indication;
         a transconductance circuit which develops a ripple voltage relative to said input voltage and said output voltage level information;
         a hysteretic comparator circuit which compares said ripple voltage with each of said first and second offset voltages and which provides first and second control signals indicative thereof; and
         a decoder circuit which receives said first and second control signals and which provides said first and second gate control signals; and
   a filter having an input coupled to the phase pin and an output providing said output voltage level information which approximates the output voltage based on voltage of said phase pin.

2. The controller integrated circuit of claim 1, wherein said filter comprises a low pass filter.

3. The controller integrated circuit of claim 1, wherein said filter comprises a resistor-capacitor filter.

4. The controller integrated circuit of claim 1, wherein said filter comprises a first order Butterworth filter.

5. The controller integrated circuit of claim 1, wherein said filter comprises an active low pass filter.

6. An electronic device, comprising:
   a switching circuit for converting an input voltage to an output voltage via a phase node;
   a feedback circuit receiving said output voltage and providing a feedback voltage; and
   a controller chip, comprising:
      a phase pin coupled to said phase node and a feedback pin receiving said feedback voltage;
      a modulation circuit which is configured to regulate said output voltage based on said input voltage, said feedback voltage and output voltage level information, comprising:
         an error amplifier circuit coupled to said feedback pin and providing an output error voltage based on said feedback voltage; and
         a modulator receiving said output error voltage, said input voltage and said output voltage level information and providing said first and second gate control signals, comprising:
            a window circuit which develops first and second offset voltages based on said output error voltage;
            a transconductance circuit which develops a ripple voltage relative to said input voltage and said output voltage level information;
            a hysteretic comparator circuit which compares said ripple voltage with each of said first and second offset voltages and which provides first and second control signals indicative thereof; and
            a decoder circuit which receives said first and second control signals and which provides first and second gate control signals; and
      a filter having an input coupled to the phase pin and an output providing said output voltage level information which approximates said output voltage based on voltage of said phase pin.

7. The electronic device of claim 6, wherein:
   said switching circuit comprises:
      a first switch device having a drain receiving said input voltage, having a source coupled to said phase node, and having a gate; and
      a second switch device having a drain coupled to said phase node, having a source coupled to a reference node, and having a gate;
   wherein said controller chip comprises a first gate pin coupled to said gate of said first switch device and a second gate pin coupled to said gate of said second switch device; and
   wherein said modulation circuit provides a said first gate control signal to said first gate pin and a said second gate control signal to said second gate pin.

8. The electronic device of claim 6, wherein said filter comprises a low pass filter.

9. The electronic device of claim 6, wherein said filter comprises a resistor-capacitor filter.

10. The electronic device of claim 6, wherein said switching circuit, feedback circuit and controller chip collectively comprise a regulator providing said output voltage to load circuitry within the electronic device.

11. The electronic device of claim 6, wherein said filter comprises an active low pass filter.

12. A method of determining a voltage level of an output voltage by a controller chip for a switched mode regulator which operates to convert an input voltage to an output voltage via a phase node, comprising:
   receiving, by the controller chip, a phase voltage from a phase pin coupled to the phase node;
   filtering, by the controller chip, the phase voltage to provide an output sense voltage having a voltage level approximating the voltage level of the output voltage;
   receiving output voltage feedback information and providing an output voltage error indication;
   developing first and second offset voltages based on the output voltage error indication;
   developing a ripple voltage relative to the input voltage and the output sense voltage;
   comparing the ripple voltage with each of first and second offset voltages and providing first and second control signals indicative thereof; and
   receiving the first and second control signals and providing first and second gate control signals.

13. The method of claim 12, wherein said filtering comprises low pass filtering.

14. The method of claim 12, wherein said filtering comprises filtering using a resistor-capacitor filter.

15. The method of claim 12, wherein said filtering comprises filtering using a first order Butterworth filter.

16. The method of claim 12, wherein said filtering comprises filtering using an active low pass filter.

17. The method of claim 12, further comprising developing the phase voltage at an intermediate node between electronic switches controlled by the controller chip.

* * * * *